US012759455B2

(12) United States Patent
Miyagishima et al.

(10) Patent No.: US 12,759,455 B2
(45) Date of Patent: Oct. 13, 2026

(54) VEHICLE INTERIOR LIGHTING SYSTEM

(71) Applicant: TOYODA GOSEI CO., LTD., Kiyosu (JP)

(72) Inventors: Yuta Miyagishima, Kiyosu (JP); Tetsuro Nishiyama, Kiyosu (JP); Yoshikazu Onishi, Kiyosu (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 9 days.

(21) Appl. No.: 19/092,349

(22) Filed: Mar. 27, 2025

(65) Prior Publication Data

US 2025/0332992 A1 Oct. 30, 2025

(30) Foreign Application Priority Data

Apr. 26, 2024 (JP) ................................ 2024-072564

(51) Int. Cl.
*B60Q 3/80* (2017.01)
*H05B 47/17* (2020.01)
*H05B 47/18* (2020.01)

(52) U.S. Cl.
CPC ............... *B60Q 3/80* (2017.02); *H05B 47/17* (2020.01); *H05B 47/18* (2020.01)

(58) Field of Classification Search
CPC ........ H05B 47/18; H05B 47/17; H05B 45/20; H05B 45/37; B60Q 3/80; B60Q 9/00; B60Q 3/64; B60Q 9/008; B60Q 3/54; B60Q 3/74; B60Q 3/51; B60Q 3/78; B60Q 3/208; B60Q 3/217; B60Q 3/20; B60Q 3/14; B60Q 1/2665; B60Q 3/82; B60Q 3/745; B60Q 1/52; B60Q 3/76; B60Q 1/0023; B60Q 3/62; B60Q 3/60; B60Q 2400/50; B60Q 1/50; B60Q 1/543; B60Q 1/26; B60Q 5/005; B60Q 1/143; B60Q 1/507; B60Q 1/268; B60Q 5/00; B60Q 1/085; B60Q 1/2696; B60Q 1/34; B60Q 3/70; B60Q 1/04; B60Q 1/2607; B60Q 1/1423; B60Q 2400/40; B60Q 1/302; B60Q 1/44; B60Q 2300/42; B60Q 1/2611; B60Q 5/008; B60Q 3/30; B60Q 3/233; B60Q 3/85; B60Q 1/0035; B60Q 1/46; B60Q 1/247; B60Q 1/2661; B60Q 2300/45; B60Q 5/006;

(Continued)

(56) References Cited

FOREIGN PATENT DOCUMENTS

| | | |
|---|---|---|
| JP | 2024-018618 A | 2/2024 |
| JP | 2024-018633 A | 2/2024 |
| JP | 2024-018652 A | 2/2024 |

*Primary Examiner* — Monica C King
(74) *Attorney, Agent, or Firm* — Posz Law Group, PLC

(57) ABSTRACT

A vehicle interior lighting system that performs LIN communication. The vehicle interior lighting system includes plural lamp units connected by a single bus cable, and a host ECU that is connected to the bus cable and controls operation of the plural lamp units. The host ECU transmits a fail-safe operation instruction signal to the plural lamp units after transmitting an operation instruction signal to the plural lamp units. The plural lamp units, when receiving the operation instruction signal properly, operate according to operation instruction information included in the operation instruction signal and ignore the fail-safe operation instruction signal and, when failing to receive the operation instruction signal properly, perform a fail-safe operation according to fail-safe operation instruction information included in the fail-safe operation instruction signal.

3 Claims, 4 Drawing Sheets

(58) Field of Classification Search

CPC ........ B60Q 2300/314; B60Q 2300/112; B60Q 2500/30; B60Q 2400/20; B60Q 3/225; B60Q 1/00; B60Q 2300/41; B60Q 1/30; B60Q 1/323; B60Q 2900/30; B60Q 1/503; B60Q 1/0088; B60Q 1/0041; B60Q 1/525; B60Q 2900/40; B60Q 3/43; B60Q 1/32; B60Q 3/68; B60Q 3/16; B60Q 1/5035; B60Q 2300/056; B60Q 3/283; B60Q 3/267; B60Q 1/2669; B60Q 1/324; B60Q 3/252; B60Q 3/18; B60Q 3/12; B60Q 2300/054; B60Q 1/544; B60Q 1/28; B60Q 3/66; B60Q 1/2615; B60Q 2400/30; B60Q 1/0076; B60Q 1/0017; B60Q 1/18; B60Q 3/10; B60Q 1/08; B60Q 1/381; B60Q 7/00; B60Q 2300/312; B60Q 3/258; B60Q 1/38; B60Q 1/5037; B60Q 1/076; B60Q 1/547; B60Q 3/229; B60Q 3/00; B60Q 1/22; B60Q 2900/50; B60Q 1/0011; B60Q 1/14; B60Q 2300/122; B60Q 2900/10; B60Q 2500/20; B60Q 11/005; B60Q 3/47; B60Q 1/346; B60Q 1/56; B60Q 1/12; B60Q 1/0094; B60Q 3/44; B60Q 1/0683; B60Q 1/0005; B60Q 11/00; B60Q 3/53; B60Q 1/24; B60Q 2300/21; B60Q 1/545; B60Q 1/549; B60Q 3/72; B60Q 1/2619; B60Q 3/88; B60Q 2300/322; B60Q 9/005; B60Q 1/48; B60Q 1/02; B60Q 1/535; B60Q 1/305; B60Q 1/20; B60Q 1/0483; B60Q 3/59; B60Q 2400/10; B60Q 3/57; B60Q 9/007; B60Q 1/06; B60Q 2300/132; B60Q 1/0408; B60Q 1/263; B60Q 1/2603; B60Q 9/006; B60Q 1/2626; B60Q 1/444; B60Q 2300/3321; B60Q 2800/20; B60Q 2300/43; B60Q 1/0491; B60Q 5/003; B60Q 2300/32; B60Q 1/54; B60Q 2300/114; B60Q 1/0052; B60Q 2300/052; B60Q 9/002; B60Q 2300/146; B60Q 2300/23; B60Q 1/245; B60Q 3/242; B60Q 1/007; B60Q 1/0433; B60Q 3/41; B60Q 1/0058; B60Q 1/304; B60Q 3/50; B60Q 2300/337; B60Q 1/10; B60Q 1/508; B60Q 1/2692; B60Q 1/1407; B60Q 1/1415; B60Q 1/326; B60Q 1/325; H04W 4/40; H04W 4/80; H04W 4/44; H04W 4/48; H04W 4/029; H04W 12/06; H04W 4/023; H04W 4/021; H04W 4/02; H04W 4/46; H04W 4/38; H04W 4/90; H04W 84/18; H04W 4/027; H04W 12/08; H04W 4/70; H04W 4/024; H04W 84/12; H04W 4/025; H04W 64/00; H04W 12/04; H04W 76/10; H04W 88/02; H04W 84/005; H04W 12/041; H04W 4/12; H04W 76/14; H04W 24/08; H04W 48/04; H04W 12/02; H04W 12/069; H04W 12/63; H04W 64/006; H04W 88/06; H04W 4/50; H04W 12/03; H04W 64/003; H04W 12/0431; H04W 4/60; H04W 76/11; H04W 8/005; H04W 48/16; H04W 76/15; H04W 24/10; H04W 12/10; H04W 4/21; H04W 24/02; H04W 72/23; H04W 4/06; H04W 4/14; H04W 4/30; H04W 4/42; H04W 4/33; H04W 88/04; H04W 4/026; H04W 8/22; H04W 88/08; H04W 12/50; H04W 12/122; H04W 36/0038; H04W 4/35; H04W 84/042; H04W 12/033; H04W 8/24; H04W 48/18; H04W 12/009; H04W 4/00; H04W 76/19; H04W 92/18; H04W 84/20; H04W 12/088; H04W 12/64; H04W 12/106; H04W 12/68; H04W 4/20; H04W 12/0433; H04W 4/08; H04W 72/0453; H04W 12/12; H04W 72/02; H04W 76/50; H04W 12/108; H04W 12/037; H04W 12/068; H04W 8/18; H04W 36/34; H04L 67/12; H04L 2012/40273; H04L 67/125; H04L 2012/40215; H04L 2209/84; H04L 67/52; H04L 67/10; H04L 12/40; H04L 67/306; H04L 67/34; H04L 9/50; H04L 63/0428; H04L 63/08; H04L 2209/80; H04L 67/1097; H04L 12/66; H04L 9/3247; H04L 67/02; H04L 1/0041; H04L 9/3239; H04L 63/102; H04L 67/025; H04L 63/0861; H04L 63/10; H04L 67/55; H04L 67/535; H04L 12/40013; H04L 9/0869; H04L 12/40006; H04L 63/123; H04L 63/0823; H04L 63/0853; H04L 9/0643; H04L 1/18; H04L 2463/061; H04L 5/0064; H04L 12/4625; H04L 1/0002; H04L 63/1416; H04L 63/1425; H04L 1/0009; H04L 63/0876; H04L 67/04; H04L 12/10; H04L 9/0891; H04L 63/083; H04L 9/14; H04L 12/403; H04L 12/2816; H04L 12/12; H04L 63/1441; H04L 12/2803; H04L 51/02; H04L 12/46; H04L 63/062; H04L 67/303; H04L 67/131; H04L 1/1874; H04L 9/3226; H04L 9/0861; H04L 65/403; H04L 9/32; H04L 69/329; H04L 1/0057; H04L 12/40032; H04L 63/06; H04L 9/3271; H04L 27/02; H04L 63/0236; H04L 67/06; H04L 12/28; H04L 63/20; H04L 69/22; H04L 9/0819; H04L 12/2825; H04L 69/08; H04L 69/18; H04L 12/40169; H04L 5/0007; H04L 67/51; H04L 1/006; H04L 12/282; H04L 63/107; H04L 9/3231

See application file for complete search history.

VEHICLE INTERIOR LIGHTING SYSTEM

CROSS-REFERENCE TO RELATED APPLICATIONS

The present patent application claims the priority of Japanese patent application No. 2024/072564 filed on Apr. 26, 2024, and the entire contents of Japanese patent application No. 2024/072564 are hereby incorporated by reference.

TECHNICAL FIELD

The present invention relates to a vehicle interior lighting system.

BACKGROUND ART

A vehicle control system is known which includes a master node and plural slave units connected thereto through an in-vehicle communication network, and can perform fail-safe operation to safely control in-vehicle devices (see PTL 1).

In the vehicle control system described in PTL 1, state information is sent from slave nodes to the master node in response to a request periodically sent from the master node. Then, in the event of voltage drop, the slave node sends state information indicating that the slave node is in a voltage drop state, to the master node.

The master node, which received the state information from a slave node that indicates that the slave node is in a voltage drop state, transmits a command to instruct to perform fail-safe processing (a fail-safe command) to the slave node which in turn performs the fail-safe processing in response to the fail-safe command.

CITATION LIST

Patent Literature

PTL 1: JP 2024/18633 A

SUMMARY OF INVENTION

In the vehicle control system described in PTL 1, transmission of the state information from the slave nodes to the master node is required for the fail-safe operation, as described above. However, in systems in which responsiveness of the slave nodes is important, such as lighting systems in which lamp units are slaves, transmission of the state information from the slave nodes to the master node for fail-safe operation is not preferable since its impact on the responsiveness of the slave nodes is not small.

It is an object of the invention to provide a vehicle interior lighting system that performs LIN communication, includes plural lamp units and a host ECU that controls operation thereof, and can perform a fail-safe operation while suppressing an impact on the responsiveness of the plural lamp units.

One aspect of the invention provides a vehicle interior lighting system as defined below.

(1) A vehicle interior lighting system that performs LIN communication, the vehicle interior lighting system comprising:

a plurality of lamp units connected by one bus cable; and a host ECU that is connected to the bus cable and controls operation of the plurality of lamp units, wherein the host ECU transmits a fail-safe operation instruction signal to the plurality of lamp units after transmitting an operation instruction signal to the plurality of lamp units, and wherein the plurality of lamp units, when receiving the operation instruction signal properly, operate according to operation instruction information included in the operation instruction signal and ignore the fail-safe operation instruction signal and, when failing to receive the operation instruction signal properly, perform a fail-safe operation according to fail-safe operation instruction information included in the fail-safe operation instruction signal.

(2) The vehicle interior lighting system defined in (1), wherein after transmitting the operation instruction signal to the plurality of lamp units, the host ECU repeatedly transmits the fail-safe operation instruction signal until transmitting a next operation instruction signal.

(3) The vehicle interior lighting system defined in (1) or (2), wherein the fail-safe operation of the plurality of lamp units is cancelled when a new operation instruction signal is received from the host ECU.

Advantageous Effects of Invention

According to an embodiment of the invention, it is possible to provide a vehicle interior lighting system that performs LIN communication, includes plural lamp units and a host ECU that controls operation thereof, and can perform fail-safe operation while suppressing an impact on the responsiveness of the plural lamp units.

BRIEF DESCRIPTION OF DRAWINGS

FIGS. 3A and 3B are conceptual diagrams illustrating the content of communication between the host ECU and a lamp unit when a fail-safe operation of the lamp unit is performed, wherein FIG. 3A shows a vehicle interior lighting system that performs a general fail-safe operation and FIG. 3B shows the vehicle interior lighting system in the embodiment of the invention.

FIGS. 4A and 4B are conceptual diagrams illustrating signals communicated between the host ECU and all the lamp units through a bus cable during when giving operation instructions to all lamp units, wherein FIG. 4A shows the vehicle interior lighting system that performs a general fail-safe operation and FIG. 4B shows the vehicle interior lighting system in the embodiment of the invention.

DESCRIPTION OF EMBODIMENTS (Configuration of a Vehicle Interior Lighting System)

Figure 1:
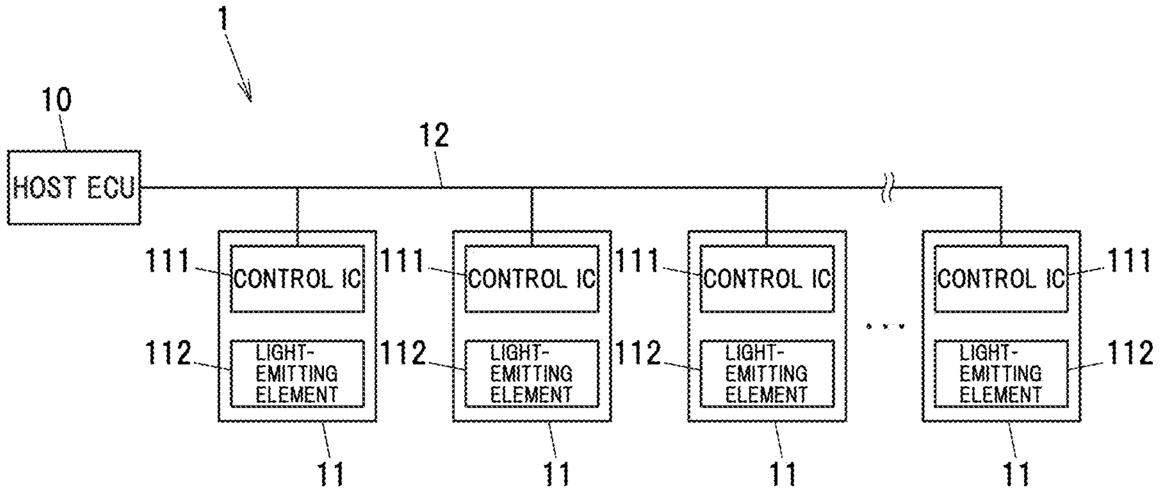
FIG. 1 is a schematic block diagram illustrating a configuration of a vehicle interior lighting system in an embodiment of the present invention.

FIG. 1 is a schematic block diagram illustrating a configuration of a vehicle interior lighting system 1 in an embodiment of the invention. In FIG. 1, power supply and GND are omitted.

The vehicle interior lighting system 1 includes plural lamp units 11 as slave devices that are connected by one bus cable 12, and a host ECU (Electronic Control Unit) 10 as a master device that transmits an operation instruction signal to the plural lamp units 11 through the bus cable 12.

The vehicle interior lighting system 1 is a vehicle interior lighting system which performs LIN (Local Interconnect Network) communication and in which operation of the plural lamp units 11 connected by one bus cable 12 can be controlled by one host ECU 10.

The number of nodes of the lamp units 11 (the number of lamp units connected by one bus cable) included in the vehicle interior lighting system 1 is typically not more than 15. The LIN communication standard recommends that the maximum number of slave devices connected to one master device be 15 due to its communication capacity.

Each lamp unit 11 includes a light-emitting element 112, such as an LED, as a light source, and a control IC 111, such as a microcomputer (microcontroller), that controls output of the light-emitting element 112 according to the content of the received operation instruction signal.

Each lamp unit 11 may include plural light-emitting elements 112. Typically, each lamp unit 11 includes a light-emitting element 112 that emits red light, a light-emitting element 112 that emits green light, and a light-emitting element 112 that emits blue light.

The host ECU 10 may be connected to a vehicle control device that is composed of an ECU, etc. and is capable of notifying the host ECU 10 of the state of the vehicle. In this case, when, e.g., the vehicle control device notifies the host ECU 10 that, e.g., a drive unit of the vehicle has been started or the vehicle has been unlocked, the host ECU 10 transmits an operation instruction signal to the plural lamp units 11 according to the content of the notification.

The host ECU 10 may also be connected to an operation unit that is to give operation instructions to the plural lamp units 11 and is operated by a vehicle occupant. In this case, when the host ECU 10 is notified that, e.g., the operation unit has been operated by an occupant, the host ECU 10 transmits an operation instruction signal to the plural lamp units 11 according to the content of the instructed operation.

The operation instruction signal transmitted from the host ECU 10 to the plural lamp units 11 is a signal to instruct the light-emitting elements 112 of the lamp units 11 to operate, and includes, e.g., output information specifying output of the light-emitting element 112 (when the lamp unit 11 includes plural light-emitting elements 112, output information for each of the plural light-emitting elements 112). The control IC 111 of the lamp unit 11 that received the operation instruction signal adjusts the amount of power supplied to the light-emitting element 112 according to the output information for the light-emitting element 112 included in the operation instruction signal, thereby controlling the output of the light-emitting element 112.

Then, after transmitting the operation instruction signal to the plural lamp units 11, the host ECU 10 transmits a fail-safe operation instruction signal to the plural lamp units 11. The fail-safe operation instruction signal is a signal that includes fail-safe operation instruction information that specifies a fail-safe operation to be performed when the plural lamp units 11 fail to properly receive the operation instruction signal.

The fail-safe operation instructed by the fail-safe operation instruction signal is typically stopping of the operation of the plural lamp units 11, i.e., turning off of lights. In this case, the control IC 111 of the lamp unit 11, which received the fail-safe operation instruction signal, stops supplying power to the light-emitting element 112 to turn off the light.

Figure 2:
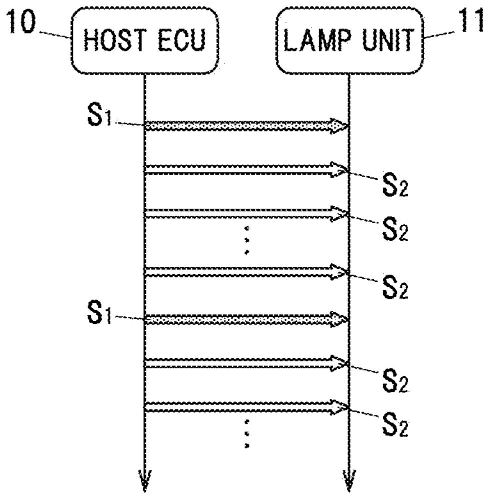
FIG. 2 is a conceptual diagram chronologically illustrating communication between a host ECU and plural lamp units in the vehicle interior lighting system in the embodiment of the invention.

FIG. 2 is a conceptual diagram chronologically illustrating communication between the host ECU 10 and the plural lamp units 11 in the vehicle interior lighting system 1. As described above, the host ECU 10 transmits a fail-safe operation instruction signal $S_2$ to the plural lamp units 11 after transmitting an operation instruction signal $S_1$ to the plural lamp units 11.

The fail-safe operation instruction signal $S_2$ is always transmitted after the operation instruction signal $S_1$ is transmitted and before the next operation instruction signal $S_1$ is transmitted, not after the host ECU 10 receives a signal from the lamp unit 11 that indicates that the communication state is not normal, etc.

When receiving the operation instruction signal $S_1$ properly, the plural lamp units 11 operate according to the operation instruction information included in the operation instruction signal $S_1$. Then, the lamp units 11 ignore the fail-safe operation instruction signal $S_2$ received after that operation instruction signal $S_1$ and do not perform the fail-safe operation.

On the other hand, when failing to receive the operation instruction signal $S_1$ properly, the lamp units 11 perform the fail-safe operation according to the fail-safe operation instruction information included in the fail-safe operation instruction signal $S_2$.

Here, the situation of failing to receive the operation instruction signal $S_1$ properly is a situation in which the lamp unit 11 cannot receive the operation instruction signal $S_1$, or a situation in which the lamp unit 11 can receive the signal but the signal content is not normal (i.e., inconsistent with the normal or predetermined operation instruction signal $S_1$). When the received operation instruction signal $S_1$ is not normal, it is processed as if the lamp unit 11 had not received the signal.

In addition, after transmitting the operation instruction signal $S_1$ to the plural lamp units 11, the host ECU 10 preferably repeatedly transmits the fail-safe operation instruction signals $S_2$ until transmitting the next operation instruction signal, as shown in FIG. 2.

When the lamp unit 11 cannot receive the operation instruction signal $S_1$ due to, e.g., communication failure, the lamp unit 11 may also be unable to receive some of the fail-safe operation instruction signals $S_2$ transmitted after the operation instruction signal $S_1$. In such a case, if the fail-safe operation instruction signal $S_2$ continues to be transmitted repeatedly, the lamp unit 11 can receive the fail-safe operation instruction signal $S_2$ at some point and perform the fail-safe operation.

LIN communication is periodic communication in which a signal continues to be sent at predetermined intervals, e.g., at intervals of 10 ms. The fail-safe operation instruction signal $S_2$ is transmitted from the host ECU 10 to the plural lamp units 11 at predetermined intervals as the periodic communication.

The fail-safe operation of the plural lamp units 11 is cancelled when a new operation instruction signal $S_1$ is received from the host ECU 10. In case where, e.g., the plural lamp units 11 have been turned off due to the fail-safe operation, the lamp units 11 turn on again according to the operation instruction when receiving properly a new operation instruction signal $S_1$.

Figure 3A:
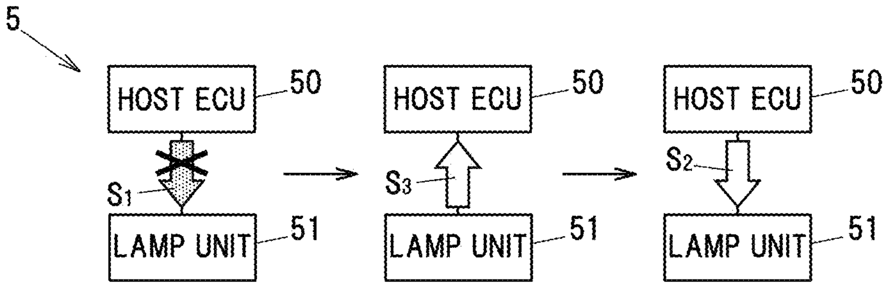

FIG. 3A is a conceptual diagram illustrating the content of communication between a host ECU 50 and a lamp unit 51 when a fail-safe operation of the lamp unit 51 is performed in a vehicle interior lighting system 5 that performs a general fail-safe operation.

In the vehicle interior lighting system 5, after the operation instruction signal $S_1$ is transmitted from the host ECU 50 to the plural lamp units 51, a signal $S_3$ including state information of the lamp unit 51 is always transmitted from each lamp unit 51 to the host ECU 50. Then, when the lamp unit 51 fails to properly receive the operation instruction signal $S_1$ transmitted by the host ECU 50, the signal $S_3$ including state information indicating failure of proper reception of the operation instruction signal $S_1$ is transmitted from the lamp unit 51 to the host ECU 50, as shown in FIG. 3A.

When the host ECU 50 receives the signal $S_3$ including the state information indicating failure of proper reception of the operation instruction signal $S_1$, the fail-safe operation instruction signal $S_2$ is transmitted from the host ECU 50 to the plural lamp units 51.

Figure 3B:
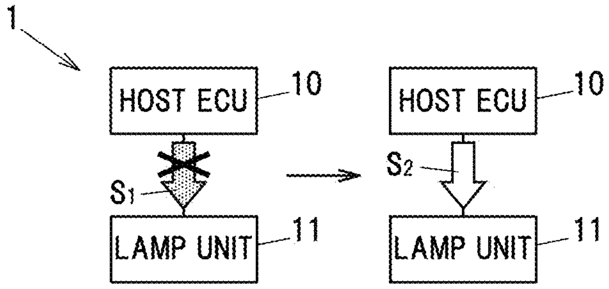

FIG. 3B is a conceptual diagram illustrating the content of communication between the host ECU 10 and the lamp unit 11 when a fail-safe operation of the lamp unit 11 is performed in the vehicle interior lighting system 1 in the embodiment of the invention.

In the vehicle interior lighting system 1, the fail-safe operation instruction signal $S_2$ is always transmitted after the operation instruction signal $S_1$ is transmitted, as described above. Therefore, in case that the lamp unit 11 fails to properly receive the operation instruction signal $S_1$ transmitted by the host ECU 10, the lamp unit 11 can receive the fail-safe operation instruction signal $S_2$ without transmitting the signal $S_3$ to the host ECU 10, as shown in FIG. 3B.

In this way, the vehicle interior lighting system 5 requires bidirectional communication between the host50 and the lamp units 51 for fail-safe operation, but the vehicle interior lighting system 1 does not require bidirectional communication between the host 10 and the lamp units 11 for fail-safe operation.

The vehicle interior lighting system 1 only performs unidirectional communication between the host ECU 10 and the lamp units 11, hence, the operation instruction signal $S_1$ can be transmitted to the plural lamp units at shorter intervals than the vehicle interior lighting system 5. That is, the vehicle interior lighting system 1 is a system which is capable of performing fail-safe operation and is also excellent in the responsiveness of the plural lamp units 11.

Next, an example of estimation results of time required to give one operation instruction to every lamp unit in the vehicle interior lighting system 5 and the vehicle interior lighting system 1 will be described. In this specific example, it is assumed that each of the vehicle interior lighting system 5 and the vehicle interior lighting system 1 includes eight lamp units and communication is performed once every 10 ms.

Figure 4A:
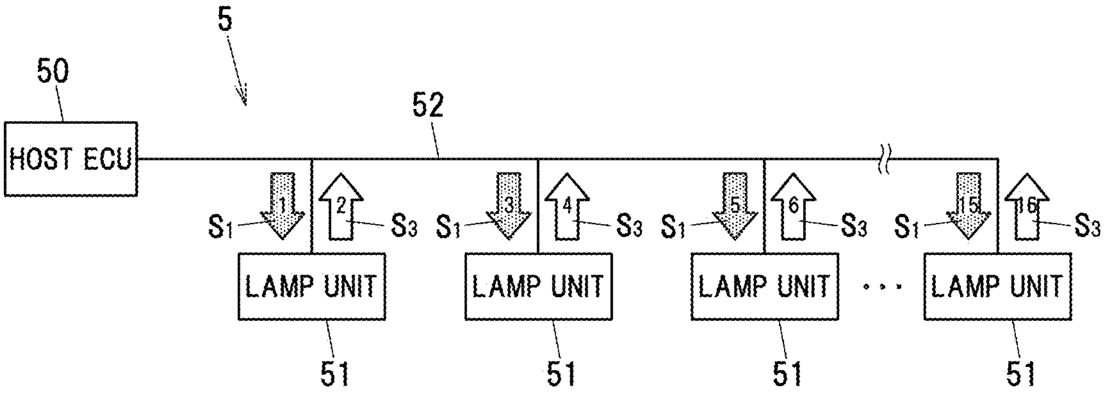
Figure 4B:
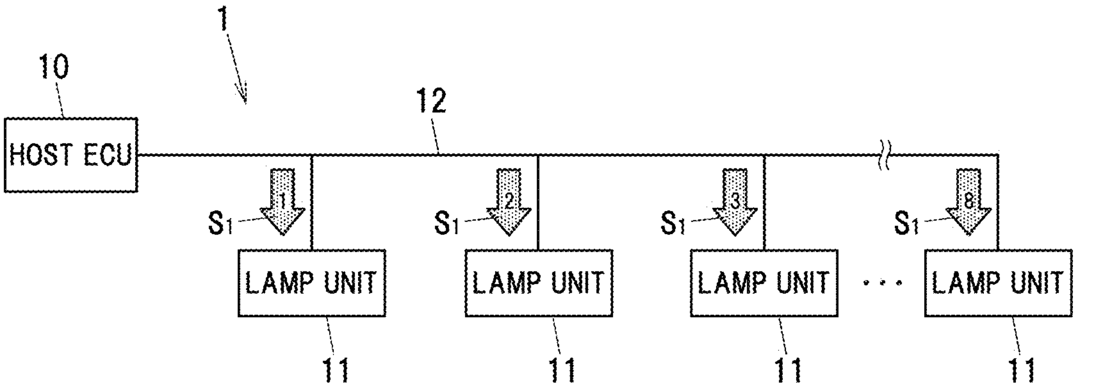

FIG. 4A is a conceptual diagram illustrating signals communicated between the host ECU 50 and all the lamp units 51 through a bus cable 52 during when giving operation instructions to all the lamp units 51 in the vehicle interior lighting system 5. FIG. 4B is a conceptual diagram illustrating signals communicated between the host ECU 10 and all the lamp units 11 through the bus cable 12 during when giving operation instructions to all the lamp units 11 in the vehicle interior lighting system 1. The numbers given to the signals in FIGS. 4A and 4B indicate the order in which the signals are transmitted.

As shown in FIG. 4A, in the vehicle interior lighting system 5, since transmission of the operation instruction signal $S_1$ and reception of the signal $S_3$ including the state information are performed for each of the eight lamp units 51, the time required to give one operation instruction to every lamp unit 51 is 160 ms (10 ms×2 times×8 units).

On the other hand, the vehicle interior lighting system 1 in the embodiment of the present invention performs only transmission of the operation instruction signal $S_1$ to each of the eight lamp units 11, hence, the time required to give one operation instruction to every lamp unit 11 is 80 ms (10 ms×8 units). In the vehicle interior lighting system 1, after the operation instruction signal $S_1$ is transmitted to every lamp unit 11 once, the fail-safe operation instruction signal $S_2$ is transmitted to all of the lamp units 11.

The vehicle interior lighting system 1 may be configured such that one host ECU 10 controls plural lamp unit groups (groups each composed of plural lamp units 11 connected by one bus cable 12).

In addition, the vehicle interior lighting system 1 may be used as part of another network, such as Controller Area Network (CAN). In this case, for example, a gateway that performs conversions between CAN communication and LIN communication corresponds to the host ECU 10.

(Example Arrangement of the Lamp Units)

The lamp unit 11 is used as a light source for, e.g., cowl illumination, foot illumination, door illumination, or luggage room illumination. The lamp units 11 arranged at different positions inside the vehicle may be connected to each other by one bus cable 12. In addition, for example, not less than two of the plural lamp units 11 connected to one bus cable 12 in the vehicle interior lighting system 1 may be connected to the same light guide.

Figure 5A:
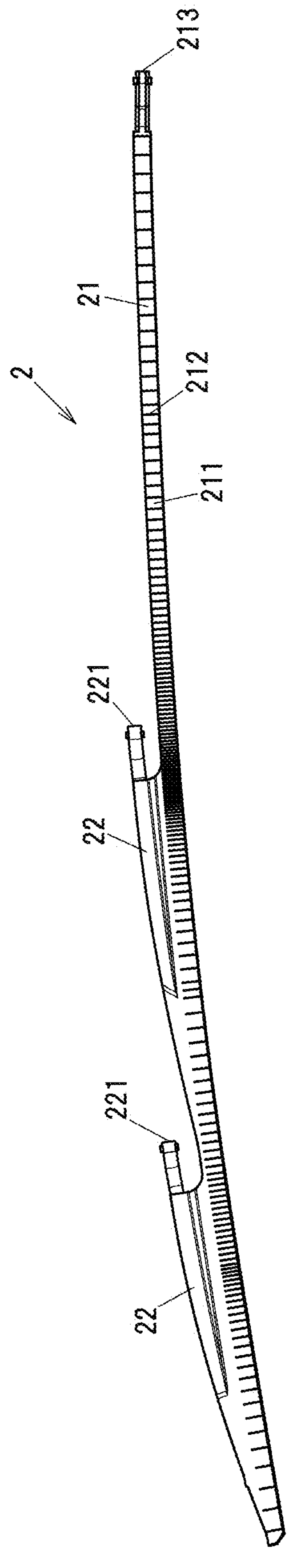
FIG. 5A is an external view showing a light guide to which not less than two of the lamp units connected by one bus cable are to be connected.

FIG. 5A is an external view showing a light guide 2 to which not less than two of the lamp units 11 connected by one bus cable 12 are to be connected. The light guide 2 includes a rod-shaped first light-guiding portion 21 on which a prism surface 211 with a prism 212 to reflect light propagating inside and emit the light to the outside is provided along a length direction thereof, and rod-shaped second light-guiding portions 22 formed integrally with the rod-shaped first light-guiding portion 21. The first light-guiding portion 21 and the second light-guiding portion 22 respectively have a light intake portion 213 and a light intake portion 221 at an end to take in light from the lamp units 11. The prism 212 is composed of, e.g., a group of linear grooves or protrusions that are lined up on the prism surface 211 and each extend in a direction orthogonal to the length direction of the first light-guiding portion 21.

Figure 5B:
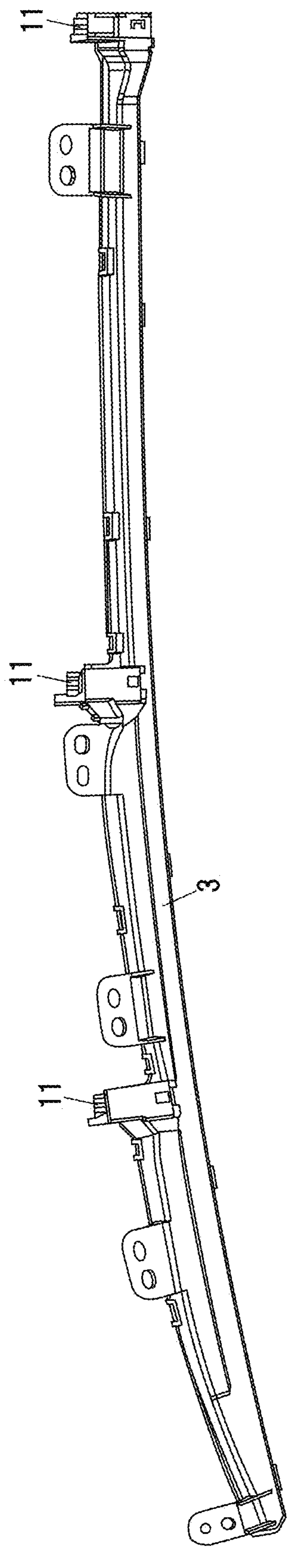
FIG. 5B is an external view when the lamp units supplying light to the light guide and a housing to house the light guide are attached to the light guide.

FIG. 5B is an external view when the lamp units 11 supplying light to the light guide 2 and a housing 3 to house the light guide 2 are attached to the light guide 2. The lamp units 11 provide light to the light intake portion 213 and the light intake portions 221 of the light guide 2. For example, each of the light guide 2 and the lamp units 11 is fixed to the housing 3, and the light guide 2, the lamp units 11 and the housing 3 constitute a lighting device used for vehicle interior, etc., such as an instrument panel.

Light emitted from the lamp unit 11 enters the first light-guiding portion 21 from the light intake portion 213 or the light intake portion 221 of the second light-guiding portion 22, is reflected at the prism 212, and exits to the outside from a surface of the first light-guiding portion 21 opposite to the prism surface 211.

(Effects of the Embodiment)

The vehicle interior lighting system 1 in the embodiment of the present invention described above is a system that performs LIN communication, has the plural lamp units 11 connected by one bus cable 12 and does not require bidirectional communication between the host 10 and the lamp units 11 for fail-safe operation.

That is, according to the embodiment of the invention, it is possible to provide a vehicle interior lighting system that performs LIN communication, includes plural lamp units and a host ECU that controls operation thereof, and can perform fail-safe operation while suppressing an impact on the responsiveness of the plural lamp units.

Although the embodiment of the invention has been described, the invention is not intended to be limited to the embodiment, and the various kinds of modifications can be implemented without departing from the gist of the invention. In addition, the constituent elements in the embodiment can be arbitrarily combined without departing from the gist of the invention. In addition, the embodiment described above does not limit the invention according to the claims. Further, please note that not all combinations of the features described in the embodiment are necessary to solve the problem of the invention.

REFERENCE SIGNS LIST

1 VEHICLE INTERIOR LIGHTING SYSTEM
10 HOST ECU
11 LAMP UNIT
12 BUS CABLE

The invention claimed is:

1. A vehicle interior lighting system that performs LIN communication, the vehicle interior lighting system comprising:

a plurality of lamp units connected by a single bus cable; and a host ECU that is connected to the bus cable and controls operation of the plurality of lamp units, wherein the host ECU transmits a fail-safe operation instruction signal to the plurality of lamp units after transmitting an operation instruction signal to the plurality of lamp units, and wherein the plurality of lamp units, when receiving the operation instruction signal properly, operate according to operation instruction information included in the operation instruction signal and ignore the fail-safe operation instruction signal and, when failing to receive the operation instruction signal properly, perform a fail-safe operation according to fail-safe operation instruction information included in the fail-safe operation instruction signal.

2. The vehicle interior lighting system according to claim 1, wherein after transmitting the operation instruction signal to the plurality of lamp units, the host ECU repeatedly transmits the fail-safe operation instruction signal until transmitting a next operation instruction signal.

3. The vehicle interior lighting system according to claim 1, wherein the fail-safe operation of the plurality of lamp units is cancelled when a new operation instruction signal is received properly from the host ECU.

* * * * *